United States Patent Office 3,714,808
Patented Feb. 6, 1973

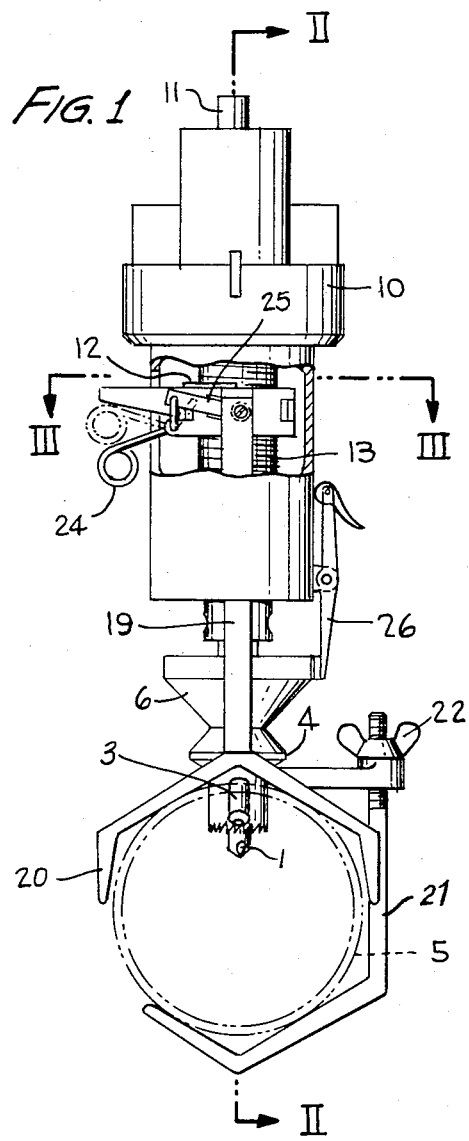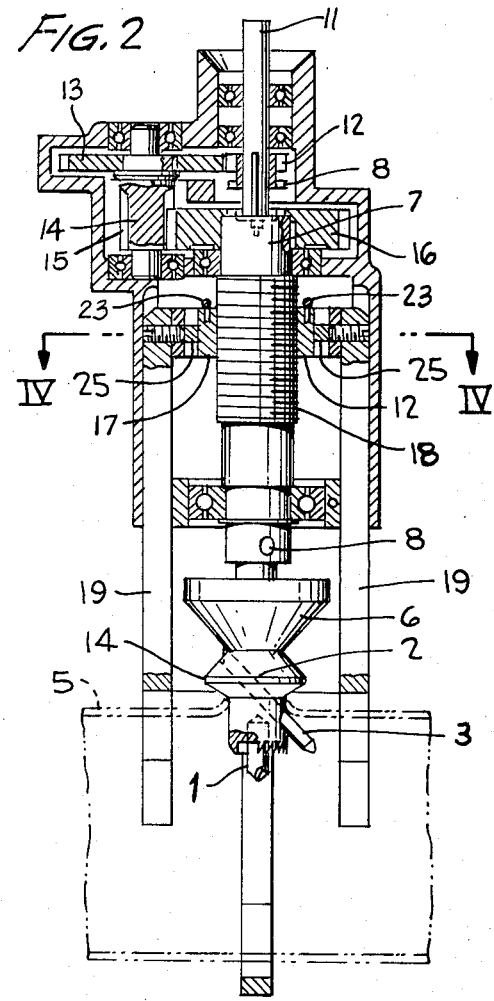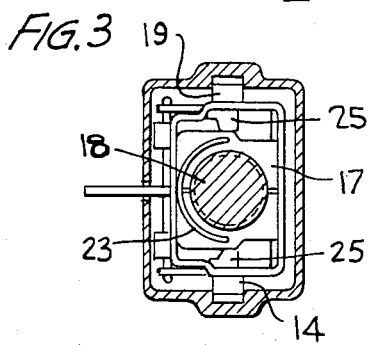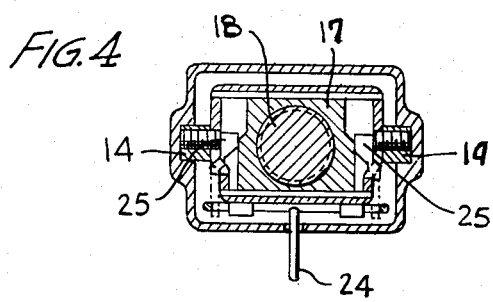

3,714,808
MEANS FOR FORMING A HOLE IN A TUBE OR PIPE WALL AND DEFORMING THE EDGE OF THE HOLE INTO AN UPSTANDING FLANGE
Leo Larikka, IV Linja 17–19 B 3, Helsinki, Finland
Continuation-in-part of application Ser. No. 744,087, July 11, 1968, now Patent No. 3,592,038. This application Mar. 17, 1971, Ser. No. 125,035
Int. Cl. B21d *31/02, 53/00*
U.S. Cl. 72—325                                 5 Claims

ABSTRACT OF THE DISCLOSURE

A tool for forming a hole and a surrounding upstanding flange for the wall of a tube into which flange a branch pipe is adapted to be attached in which a drill is provided with at least two components which, after drilling of the hole, can be extended under the edge of the hole whereby, upon withdrawal of the drill, the components form a projecting flange at the edge of the hole. For forming the flange and particularly for returning the drill, means are employed to obtain an appropriate number of revolutions and return feeding as well as a support for the work piece or the tube.

BACKGROUND OF THE INVENTION

This application is a continuation-in-part of my copending application Ser. No. 744,087 filed July 11, 1968, Pat. No. 3,592,038.

In the above-identified application, there is provided means for forming a hole and a surrounding upstanding flange for a tube wall and to which flange a branch pipe or tube is attached. The means includes a drill and at least two flange forming tools symmetrically arranged on the drill for movement from a position in which the tools are located within the confines of the drill to a position projecting from the drill so that after the drilling of the hole, the flange forming tools are extended to underlie the edge of the hole whereby, upon withdrawal of the drill from the tube, the tools deform the wall to produce the upstanding flange at the edge of the hole.

For deforming the wall of the tube and particularly for returning the drill to effect this operation, means are required so that an appropriate number of revolutions and return feeding as well as support for the tube can be realized.

An object of the present invention is to provide a tool of the type described including such last-mentioned means.

SUMMARY OF THE INVENTION

Generally speaking, the invention is directed to an assemblage for drilling a hole in the wall of a tube and for deforming the edge of the thus drilled hole to provide an upstanding flange including a body, a power input shaft, a drill provided with flange forming tools, a drive shaft for the drill, a gear train interposed between the power input shaft and the drive shaft to decrease the drilling speed into another working speed and feet carried by the body for supporting the assemblage towards the work piece. Complemental means are provided for the body and the drive shaft whereby an axial movement is obtained from the rotation for the drill. More specifically, the feet are supported by the body so that the feet move axially and are attached to the drive shaft by a two-part nut unit which is capable of being opened and closed, with the nut in the closed position being in threaded engagement with a complementary threaded portion of the drive shaft and in the opened position being detached from such threaded portion.

Moreover, the feet are substantially V-shaped for directing the axis of the assembly on the axis of the tube and include projecting parts for receiving the torsional movement.

Further objects and advantages of the invention will become more readily apparent to persons skilled in the art from the following detailed description and annexed drawings, and in which drawings:

BRIEF DESCRIPTION OF THE FIGURES

FIG. 1 is a view in side elevation and partly in cross section of an assemblage embodying the present invention, FIG. 2 is a view partly in vertical section and partly in elevation of the device shown in FIG. 1, FIG. 3 is a view taken along line III—III of FIG. 1, the view looking in the direction of the arrows, and FIG. 4 is a view taken along line IV—IV of FIG. 2, the view looking in the direction of the arrows.

At the outset, the assemblage includes a metal drill 1 provided with two bores 2 of which only one is illustrated, with such bores being located on both sides of the center line of the drill. The bores define with the central axis of the drill an angle so that flange forming tools 3 positioned in the bores can project from the drill to a position below a supporting extension 4 as shown by the full line in FIG. 2. In other words, between the upper edge of the protruding tool 3 and the lower part of the extension 4, there remains an unbroken cylindrical surface at least as thick as the wall of a pipe or tube 5 being drilled.

A regulating device, part of which includes a cone 6, as a taper corresponding to the angle between the flange forming tools 3 and such cone is similar in structural detail and operation to the cone disclosed in my copending application Ser. No. 744,087.

Upon turning of the cone 6 towards the drill 1, the tools 3 move in their axial direction and can be positioned for flange diameters of different sizes.

When a hole is to be formed in the tube or pipe 5, the flange forming tools are within the confines of the drill, and after drilling of the hole, the drill is positioned into the tube up to the extension 4. Upon rotating the cone 6, the tools 3 are forced or pushed inside the tube 5 below the edge of the hole and are locked at the desired location by the regulating device. Thereafter, while the drill 1 continues to rotate, the drill is withdrawn from the tube whereupon the tools 3 deform the edge of the hole to form the flange shown in the dot-dash lines in FIG. 2 and to which flange a branch pipe can be readily secured such as by soldering. The drill 1 and the regulating device are attached to a drive shaft or spindle 7 by a suitable clamping unit 8.

The present assemblage includes a body 10 and a power input shaft 11 is journaled within the body and is adapted to be coupled to a driving motor in any suitable manner. When the assemblage is used in a drilling machine, the input shaft 11 is attached to the chuck of the drilling machine so that a rotational velocity corresponding to the number of revolutions of the motor is obtained for the input shaft. While such velocity is generally suitable for drilling per se, it is too high for forming the upstanding flange and for certain other types of work.

In accordance with the present invention, it will be noted that the input shaft 11 is provided with a gear 12 which can be placed in mesh with a gear wheel located at the upper end of the drive shaft 7. Hence, rotation of the input shaft 11 is thereby transmitted directly to the drive shaft 7 and thence to the regulating device 6 and the drill 1.

For other work which is to be accomplished in addition to the drilling, the gear wheel 12 is unmeshed from the gear wheel of the drive shaft 7 and placed in mesh with a gear wheel 13 (FIG. 2) carried by an intermediate shaft 14 spaced from and parallel to the drive shaft 7. The intermediate shaft 14 is also provided with teeth 15 adapted to mesh with the teeth of a gear wheel 16 fixed on the drive shaft 7. The meshing of the gear wheel 12 with the upper end of the drive shaft 7 or with the gear wheel 13 is effected by axial movement. The gear wheels have been so selected that a reduction gearing is obtained so that when the drive from the input shaft 11 is via gear wheel 12, gear wheel 13 and gear wheel 16 the rotational velocity of the input shaft decreases for example, to a third.

In addition to a decrease of the rotational velocity, a return feed or movement must be obtained for the drill 1 so that each of the drilled holes in the tube 5 can be deformed upwardly by the flange forming tools 3 in the manner illustrated by the dot-dash lines in FIG. 2.

To achieve this end, the body 10 includes a nut unit 17 which is in two parts. The nut unit 17 is adapted to threadedly engage a threaded portion 18 of the driving shaft 7 and such is a left-handed threading whereby, upon rotation of the input shaft 11 and the driving shaft 7, the nut unit together with supporting feet 19 suitably attached thereto is forced outwardly of the body portion and the drill 1 together with the tools 3 draw away from the tube 5. This is due to the fact that the feet 19 are substantially V-shaped as illustrated in FIG. 1 and the apex thereof centers the axis of the body 10 to the axis of the tube 5. It will further be noted that the feet are provided with projecting components 20 which receive the torsional moment. Actually only one part 20 is required, but such parts are preferably situated on different sides in order to receive the torsional moment. In addition, a bow-loke member 21 which is used alternatively with the feet is fixed to the assemblage by a wing nut or the like 22.

The opening and closing of the nut unit 17 is of essential importance and the opening is effected by means of a spring 23, the ends of which are located on the parts of the nut unit, while the closing is accomplished by moving downwardly a lever 24 as shown in the full line position in FIG. 1 whereby wedges 25 move toward the lever thereby pressing the nut portions towards each other in order to close the nut unit. The return feed is thus compled.

The nut is opened by raising the lever 24 to the dot-dash line position in FIG. 1 whereby the wedges 25 move away from the lever as indicated by the arrows in FIG. 4 and the spring 23 draws the nut parts from each other whereby the return feed is arrested.

In FIG. 1 there is also illustrated a lever 26 which is pivoted to the body 10 and which is adapted to coact with the regulating device 6 so that the regulating device and the drill 1 can be braked to enable the tools 3 to leave the drill. A counter spring (not illustrated) draws the tools 3 into the drill when a flange forming operation is not being accomplished.

While the operation is believed readily apparent from the foregoing, it may be summarized as follows:

When a flange is to be formed about the drilled hole, the feet are positioned on the tube as illustrated and the nut unit is closed. The drive from the input shaft 11 is through gear wheel 12, gear wheel 13, and gear wheel 16 to the drive shaft 7. Hence, the rotational velocity of the drill 1 and the tools 3 is less than that of the input shaft 11. The nut unit moves outwardly due to its threaded engagement with the threaded portion 18 of the drive shaft 7 and presses the feet against the tube 5, with the drill 1 and tools 3 drawing away from the tube 5 which supports the feet 19.

The invention is not to be confined to the showings in the drawings but changes or modifications may be made therein so long as such changes or modifications mark no material departure from the spirit and scope of the appended claims.

I claim:

1. In an assemblage for drilling a hole and forming a surrounding upstanding flange for a tube wall and to which flange a branch pipe is adapted to be attached, a drill, at least two flange forming tools symmetrically arranged on the drill for movement from a position in which the tools are within the confines of the drill to a position projecting from the drill whereby following drilling of the hole, the tools are extended to underlie the hole and upon withdrawal of the drill, the tools deform the wall to produce the upstanding flange at the edge of the hole, a drive shaft for the drill, a power input shaft, said drive shaft having first and second gear means, said power input shaft having gear means, an intermediate shaft, said intermediate shaft having first and second gear means adapted to mesh, upon axial movement of the input shaft, with the gear means on the input shaft and the second gear means of the drive shaft so that when the drive from the input shaft is via the second gear means on the intermediate shaft and the second gear means on the drive shaft, the drive shaft is driven at a rotational velocity less than the velocity of the input shaft, a two-part nut unit within the body encircling the drive shaft, said drive shaft having a threaded portion cooperable with the threads of the nut unit when the nut unit is closed, and supporting feet carried by said nut unit engaging the tube wall whereby rotation of the drive shaft effects axial movement of the supporting feet outwardly of the body so that the supporting feet receive the turning movement and force the drill and tools from the hole in the wall of the tube.

2. The assemblage as claimed in claim 1, in which said supporting feet are substantially V-shaped, with the apex thereof centering the axis of the body on the axis of the tube.

3. The assemblage as claimed in claim 2, in which the ends of the feet include projecting parts for receiving the torsional moment.

4. The assemblage as claimed in claim 1, in which said nut unit includes two parts, spring means cooperable with said parts to maintain such parts in spaced relationship, wedges cooperable with said parts, and a lever projecting from the body cooperable with said wedges to close said parts about the drive shaft into threaded engagement with the threaded portion of the drive shaft.

5. The assemblage as claimed in claim 1 comprising a lever pivoted to the body cooperable with the drill to brake the drill to enable the flange forming tools to be formed within the confines of the drill and without the confines thereof.

References Cited

UNITED STATES PATENTS 576,556  2/1897  Davis _____ 72—325

RICHARD J. HERBST, Primary Examiner

R. M. ROGERS, Assistant Examiner

U.S. Cl. X.R.

29—157 T; 72—449